US008055235B1

(12) United States Patent
Gupta et al.

(10) Patent No.: US 8,055,235 B1
(45) Date of Patent: Nov. 8, 2011

(54) SYSTEM AND METHOD FOR DIGITAL INTERFERENCE CANCELLATION

(75) Inventors: Deepnarayan Gupta, Hawthorne, NY (US); Amol Inamdar, Elmsford, NY (US)

(73) Assignee: Hypres, Inc., Elmsford, NY (US)

( * ) Notice: Subject to any disclaimer, the term of this patent is extended or adjusted under 35 U.S.C. 154(b) by 335 days.

(21) Appl. No.: 12/434,590

(22) Filed: May 1, 2009

Related U.S. Application Data

(60) Provisional application No. 61/050,161, filed on May 2, 2008.

(51) Int. Cl.
*H04B 1/10* (2006.01)
(52) U.S. Cl. .......................................... 455/296; 455/318
(58) Field of Classification Search .................. 455/296, 455/318, 251.1, 226.1, 127.1, 67.11
See application file for complete search history.

(56) References Cited

U.S. PATENT DOCUMENTS

| | | | |
|---|---|---|---|
| 5,604,925 A * | 2/1997 | O'Malley et al. ............. | 455/254 |
| 5,729,829 A | 3/1998 | Talwar et al. | |
| 5,939,881 A | 8/1999 | Slater et al. | |
| 6,509,853 B2 | 1/2003 | Gupta | |
| 6,693,971 B1 | 2/2004 | Kowalski | |
| 7,027,793 B2 * | 4/2006 | Gard et al. ..................... | 455/318 |
| 7,035,614 B2 * | 4/2006 | Dessert et al. ................ | 455/315 |
| 7,058,368 B2 | 6/2006 | Nicholls et al. | |
| 7,280,623 B2 | 10/2007 | Gupta et al. | |
| 7,313,199 B2 | 12/2007 | Gupta et al. | |
| 7,603,084 B2 * | 10/2009 | Aytur ........................... | 455/63.1 |
| 7,813,453 B2 * | 10/2010 | Khandekar et al. .......... | 375/340 |

OTHER PUBLICATIONS

Mukhanov, et al., "Superconductor Analog-to-digital Converters", Proceedings of the IEEE, vol. 92, Issue 10, Oct. 2004, pp. 1564-1584.

* cited by examiner

*Primary Examiner* — Henry Choe
(74) *Attorney, Agent, or Firm* — Steven M. Hoffberg; Ostrolenk Faber LLP

(57) ABSTRACT

A system and method for receiving a signal, comprising an input adapted to receive a radio frequency signal having a strong interferer; a signal generator, adapted to produce a representation of the interferer as an analog signal generated based on an oversampled digital representation thereof; and a component adapted to cancel the strong interferer from radio frequency signal based on the generated analog signal to produce a modified radio frequency signal substantially absent the interferer. The system typically has a nonlinear component that either saturates or produces distortion from the strong interferer, which is thereby reduced. The system preferably employs high speed circuits which digitize and process radio frequency signals without analog mixers.

36 Claims, 9 Drawing Sheets

SYSTEM AND METHOD FOR DIGITAL INTERFERENCE CANCELLATION

RELATED APPLICATIONS

The present application is a non-provisional of U.S. Provisional Application 61/050,161, filed May 2, 2008, the entirety of which is expressly incorporated herein by reference.

BACKGROUND OF THE INVENTION

1. Field of the Invention

The present invention relates to interference cancellation techniques, and more particularly, to digital interference techniques at radio frequencies.

2. Description of the Prior Art

The problem of interference in RF receivers is well known. One approach is to try to filter the interferers; the other is to actively cancel them by generating a signal corresponding to each interferer and subtracting it from the input. In the former technique, it is possible that signal components are lost in the filter, since these generally cannot distinguish between the interferer and the signal of interest if it has components within the filter stop band. The latter has the ability to model the interferer, and therefore remove only the interferer without substantial loss of signal. In order to effectively cancel an interferer, its characteristics must be well known, and, in the event of a dynamic interferer, its temporally changing characteristics must also be modeled, since inappropriate attempts at cancellation can increase interference.

One can describe three common classes of interferers (see FIG. 1). Co-site interference comes from one's own transmitter, where one typically has direct access to the interferer. Another type is interference that is of a known signal type, which may be present to different degrees at different times (such as a radar source or a simple jammer). This can be generated from a signal template, with appropriate gain, delay, and parametric adjustments. A third type is one that is a complex, unknown signal, which must be carefully measured in real-time to be actively cancelled.

There are many prior patents on active interference reduction. A few of these might include the following: U.S. Pat. No. 5,729,829 Talwar and Fitzgerald (American Nucleonics Corp), Interference mitigation method and apparatus for multiple collocated transceivers, issued 1998; U.S. Pat. No. 6,693,971 Kowalski (BAE Systems), Wideband Co-Site interference reduction apparatus, issued 2004; and U.S. Pat. No. 7,058,368 Nicholls and Roussel (Nortel), Adaptive feedforward noise cancellation circuit, issued 2006, each of which is expressly incorporated herein by reference.

Known attempts to cancel interferers either employ analog signals, or use digital baseband signals with analog upconversion or carrier envelope modulation. Indeed, in the case of narrow-band interferers, digital baseband signal generation with upconversion and amplitude and phase adjustment to obtain optimum cancellation produces generally acceptable results (see FIG. 3).

Tolerating high levels of interference, including those from co-located RF transmitters, is a longstanding problem for building wideband and sensitive naval signals intelligence (SIGINT) and communication receivers. The presence of unwanted signals or interferers reduces the usable spectrum and hence the dynamic range of the receiver. The traditional method of dealing with the interference problem is to use band-stop or notch filters to excise the interferers from the band-of-interest. This approach, employing analog RF components, works well when there are a small number of fixed interferers spectrally separated from the signals of interest (FIG. 2A). It does not work well when the interferers are numerous, overlap the signal bands of interest, or change their spectral locations rapidly (see FIG. 2B).

A recent approach to broadband radio receivers is to directly digitize an entire broad band at a very high sampling rate, followed by digital processing to select signals of interest and reject interferors. Such a Digital-RF™ (Hypres Inc., Elmsford, N.Y.) receiver enables flexible, reconfigurable reception of multiple signals across the band. However, the presence of large interferers within this broad band requires an analog-to-digital converter (ADC) with extremely high linear dynamic range. In principle, digital filters may be used to remove interferers in the digital domain. In practice, if the interferers are too large, they will saturate the ADC, limiting the dynamic range available to the signal. In addition, small amounts of nonlinearity in the analog signal processing chain can result in intermodulation products and harmonics. If one or more interferers are strong, and the signal has a wide bandwidth, the pattern of spurious signals (so-called "spurs") can interfere with processing of a signal of interest. So it is necessary in the case of large amplitude interferers to cancel or substantially reduce the interferers early in the analog signal processing chain, before the ADC, to avoid non-linear effects such as saturation and intermodulation. As used herein, it is understood that a quantizer or digitizer is a non-linear component of a circuit, and therefore that the phrase non-linear component includes such digitizers and quantizers. It is also understood that real implementations of analog to digital converters are typically saturable, that is, having a response dependent on a past history, especially if the signal presented exceeds a saturation level, and thus appears to respond non-linearly on that basis.

Typically, a Digital-RF™ receiver will have a digital sample rate in excess of a Nyquist rate of a significant signal represented therein. That is, the Digital-RF™ signal is oversampled with respect to the corresponding analog representation. At radio frequencies, this may involve very high data rates. Advantageously, such digital data generation and handling capability is available from superconducting electronics, though other technologies may also be employed.

SUMMARY OF THE INVENTION

According to a preferred system architecture of the present technology, a Digital-RF™ interference cancellation signal, i.e., a digital bitstream which is oversampled with respect to a corresponding analog radio frequency waveform, may be directly synthesized in a process without analog upconversion (and may even be combined digitally), followed by conversion to the analog representation in a digital-to-analog converter (DAC) and analog subtraction from the input signal received from the antenna, before the ADC of the receiver (see FIG. 4). This requires similar ultrafast sampling technology that is used in the Digital-RF™ receiver, and therefore can be implemented efficiently. Indeed, the use of predictive peak amplitude reduction, from interferers or even the normal expected signal to be received, can facilitate the receiver design, since the technology will increase the effective dynamic range of an ADC.

It is noted that, in radio frequency electronics, especially dealing with broadcast signals over 1 GHz, the modulation of symbols is typically much less than 1 symbol/MHz of raw spectrum; that is, the modulation state of a signal will extend over multiple peaks and valleys of the radio frequency carrier. Therefore, an interference reduction system which responds in near real time to interference or saturation conditions of the ADC may be able to successfully demodulate a symbol in the radio frequency transmission, even if the ADC is initially saturated by the received signal. Even if the interference or saturation cancellation system does not respond within the minimum symbol timing, typically an interference condition is quasi-static and extends over multiple symbol periods. Therefore, error detection and correction codes provided within a digital communication may permit tolerance to some degree of time lag in establishing the interference or saturation cancellation conditions and/or agile interference conditions. It is noted that, in the case of a saturating signal, as compared to an interferer, the system may be configured to provide a controllable attenuation of the signal, rather than a successive-approximation or half-flash type signal amplitude reduction.

This Digital-RF™ interferer synthesis has several features that cannot be easily achieved by other methods. In particular, one can apply signal adjustments that go beyond simple amplitude and phase adjustments of the baseband approach. For example, with a very broadband signal, a lookup table can provide rapid adjustments in the time domain, or a digital filter can apply frequency-dependent gain factors and time delays. Further, broadband nonlinear distortion can be generated, which might simulate the distortion of a high-power transmitter that is causing the interference.

For a Digital-RF™ transceiver with incoming and outgoing signals in nearby bands, co-site interference can be a serious problem. In one embodiment of the present technology, the digital-RF™ interference synthesizer can be closely integrated with the Digital-RF™ transmitter, providing interference cancellation with only a few additional circuits (see FIG. 5). These additional circuits may include digital gain and delay circuits, as well as a digital cross-correlator for automatic delay adjustment (see FIG. 8). In another embodiment of the technology, the digitally synthesized interferer may be generated using a waveform template library and a cross-correlator (see FIG. 9).

In an electronic countermeasures scenario, a large amplitude interfering signal pattern may be intentionally generated which would make it difficult to receive a signal of interest. Thus, the system may be made to intentionally operate at a limit of its capabilities, such that inferior systems would be prevented from obtaining the signal of interest. In such a case, typically a set of interferers is created which would, in the presence of nonlinear analog elements, generate spurs which nearly overlap a potential pattern of a signal of interest. Such intermodulation spurs have a frequency and amplitude dependent on at least an amplitude and frequency of the interferer. Therefore, in at least this case, the issue of interference-induced spurious signals overlapping a signal band of a desired communication is not a theoretical problem; but one which is intentionally exploited. Further, as the bandwidths of signals of interest grow large, the potential for intentional or unintentional interference increases.

Typically, a radio receiver has limited complexity, and cannot analyze each peak within a band to determine whether it is part of a desired communication or represents interference (i.e., a spur). Therefore, it is desired to reduce the absolute amplitude of such spurs and this increase the spur-free dynamic range (SDFR). Thus, in accordance with one aspect of the technology, a feedback controlled signal is injected into an analog radio frequency signal which reduces an amplitude of a large amplitude interfering signal, and thus also reduces the amplitude of intermodulation spurs associated with that interfering signal. It is noted that the spurs are considered a form of noise, and therefore a reduction in the relative amplitude of the spurs as compared to the signal of interest increases a signal to noise ratio (SNR) or a signal to noise and distortion (SINAD) ratio.

Circuits for this Digital-RF™ cancellation may be implemented using ultrafast superconducting rapid single flux quantum (RSFQ) technology, with sampling and clock rates up to 40 GHz and above. A precision analog broadband radio frequency combiner, called a "flux subtractor", is therefore provided (FIGS. 6 and 7). It is noted that the implementation of the technology is not limited to RSFQ technology, or superconducting electronics, and may be applied to any system with sufficiently fast processing capabilities, such as silicon, silicon-germanium, gallium arsenide, indium phosphide, silicon carbide, diamond, or other existing and emerging technologies.

The present invention thus presents a different approach to the problem of interferers than prior attempts, using a technology known as "Digital-RF™", which digitizes a large bandwidth of spectrum, for example an entire radio frequency band, with an analog-to-digital converter (ADC) (without intermediate downconversion) and performs signal extraction and interference rejection in the digital domain. However, the simple Digital-RF™ approach exploits a high dynamic range, which may be difficult to achieve over a broadband range of RF spectrum.

The present technology addresses, for example, the critical co-site interference problem with an improved architecture that permits wideband cancellation of undesired high power signals, thereby providing better utilization of the available dynamic range. A preferred embodiment of the architecture employs a flux subtractor preceding the ADC modulator, which performs accurate subtraction of unwanted signals before the front-end of a receiver, and thus enhances its operation in a high electromagnetic interference (EMI) environment. Such a flux subtractor is compatible with superconducting RSFQ circuitry, and is thus readily integrated. Likewise, the flux subtractor produces low distortion, thus avoiding substantial tradeoffs. Of course, other architectures may be employed to selectively subtract an interferer from a received signal, such as a current summer. The flux subtractor architecture potentially allows a plurality of signals to be coupled concurrently, and thus permits a parallelization of interference signal processing, as may be desired or required.

While interference from intentional (enemy) jammers remains a major problem for receivers, the broader problem of co-site interference is particularly severe for an electronic attack aircraft. Here, multiple high power communications and radar transmitters exist in close proximity to RF receivers on the same platform. Given the limited amount of space available on most platforms, it is therefore easy to understand that high power transmit antennas may interfere with nearby receive antennas. In fact, a typical transmit antenna will radiate hundreds or thousands of watts of power, whereas the power of the desired receive signal will be a very small fraction of that. If the receive antenna is located in relatively close proximity to the transmit antenna, residual transmitted power will be coupled to the receive antenna.

It is therefore an object to provide a flexible all-digital cancellation scheme, whereby a digitally synthesized signal is fed to a digital-to-analog converter (DAC) and combined with the RF input in front of the ADC. A cancellation signal may include two or more independent interferers that are combined in either analog or digital form and may extend across a broad RF band at multi-gigahertz frequencies (see FIG. 9).

In one embodiment, the digital cancellation signal may be adapted from co-located digital transmission signals. In an alternative embodiment, the digital cancellation signal may be selected from a library of digital sources, with the help of a digital correlation receiver and spectrometer. In a third embodiment, the digital cancellation signal may be actively adjusted by adaptively minimizing the nulled interference signal. These approaches may be implemented for a broadband RF receiver system using ultrafast superconducting electronics. It is therefore an object to provide a receiver having at least one non-linear component, comprising: an input adapted to receive a radio frequency input signal having at least one signal of interest and at least one radio frequency signal component having an amplitude which is at least one of: sufficient to saturate a saturable element; or distorted by the at least one non-linear component to generate at least one distortion component, e.g., an intermodulation component and/or a harmonic, having an distortion amplitude; a digital signal generator, adapted to produce an oversampled digital representation of the at least one radio frequency signal component; a digital to analog converter, adapted to produce a radio frequency analog signal corresponding to the oversampled digital representation of the at least one radio frequency signal component, and being controlled with respect to at least one of relative time and relative amplitude with respect to the at least one radio frequency signal component; and a component adapted to receive the radio frequency input signal and the radio frequency analog signal, and cancel the at least one radio frequency signal component from the radio frequency input signal to produce a modified radio frequency signal in which a residual portion of the radio frequency signal component does not saturate the saturable element or is associated with a distortion amplitude of the at least one distortion component reduced by at least 3 dB, and in which the signal of interest is substantially unmodified, with respect to a modified radio frequency signal produced if the radio frequency analog signal has zero amplitude, and corresponding method of use.

It is a further object to provide a method for receiving a radio frequency input signal having at least one signal of interest and at least one radio frequency signal component having an amplitude which is at least one of: sufficient to saturate a saturable element of a receiver; or distorted by the at least one non-linear component of the receiver to generate at least one distortion component, e.g., an intermodulation component and/or a harmonic, having a distortion amplitude; producing an oversampled digital representation of the at least one radio frequency signal component; producing a radio frequency analog signal corresponding to the oversampled digital representation of the at least one radio frequency signal component, and having at least one of a relative time and a relative phase which is adjusted with respect to the at least one radio frequency signal component; and cancelling at least a portion of the at least one radio frequency signal component from the radio frequency input signal to produce a modified radio frequency signal in which a residual portion of the radio frequency signal component does not saturate the saturable element or is associated with a distortion amplitude of the at least one distortion component reduced by at least 3 dB, and in which the signal of interest is substantially unmodified, with respect to a modified radio frequency signal produced if the radio frequency analog signal has zero amplitude, and corresponding system.

Another object of the invention provides an interfering signal cancellation apparatus, comprising: an input adapted to receive an analog radio frequency signal within a band having a signal of interest having a signal amplitude and an interferer signal having an interferer signal amplitude; a signal generator adapted to generate a cancellation signal based on an oversampled digital representation of at least the interferer signal; and a cancelling device adapted to receive the analog radio frequency signal and the cancellation signal and produce a modified analog radio frequency signal, wherein the signal generator produces the cancellation signal having a timing and amplitude adapted to increase a signal to interferer amplitude ratio of the modified analog radio frequency signal over the analog radio frequency signal by at least 20 dB.

The modified radio frequency signal may be produced by coupling magnetic fields associated with the radio frequency analog signal and the radio frequency input signal. The receiver may comprise a saturable or non-linear element formed from at least one Josephson Junction. A relative time characteristic of the radio frequency analog signal may be adjusted in dependence on a digital correlator output. The oversampled digital representation may be generated based on a digital lookup table. The radio frequency signal may comprises a plurality of radio frequency signal components, and a corresponding plurality of oversampled digital representations are generated.

A further object provides an interfering signal cancellation apparatus, comprising: an input adapted to receive an analog radio frequency signal within a band; a signal generator adapted to generate a cancellation signal based on an oversampled digital representation of at least a portion of the analog radio frequency signal; a cancelling device adapted to receive the analog radio frequency signal and the cancellation signal and produce a modified analog radio frequency signal; an analog radio frequency processing chain having at least one non-linear element which distorts the modified analog radio frequency signal; and a digitizing device adapted to quantize an amplitude of the modified analog radio frequency signal, producing a digital output, wherein the signal generator produces the cancellation signal having a timing and amplitude adapted to improve a signal to noise ratio of the modified analog radio frequency signal over the modified analog radio frequency signal which would result if the cancellation signal had zero amplitude.

The cancelling device may operate by coupling magnetic fields associated with the analog radio frequency signal and the cancellation signal. The cancelling device may comprise a superconductor. The digitizing device may comprise at least one Josephson Junction. The cancellation signal may be generated based at least in part on an output of a digital correlator accepting samples at a rate above a Nyquist rate for the received analog radio frequency signal. The digitizing may comprise an analog to digital converter having a sampling rate of at least 1 GHz, preferably greater than 2 GHz, more preferably greater than 10 GHz, and most preferably at 20 GHz, 40 GHz or higher. The analog to digital converter may be a single bit or multi-bit type, and, for example, may be a delta-sigma type converter. The digitizing device may comprise a system producing a digital output representing the analog radio frequency signal at a rate of at least 2 gigasamples per second.

The analog radio frequency signal may comprise a signal of interest and an interfering signal, the cancellation signal substantially corresponding to the interfering signal. A digital correlator may be provided to determine a time characteristic of an interfering signal, and wherein based on the determined time characteristic at least a relative delay of the cancellation signal is controlled to reduce an amplitude of the interfering signal provided to the device. A digital model of an interfering signal model may be represented within a lookup table is employed in the signal generator to generate the cancellation signal.

A source of an interfering signal may be cooperative with the apparatus and provide a representation of the interfering signal as generated for use in generating the cancellation signal. The representation of the interfering signal may be received as a digital signal or in an analog form. A source of an interfering signal may comprise a digital synthesizer providing the representation of the interfering signal as a digital representation, and further comprises an analog feedback device comprising an analog-to-digital converter to ensure that the digital representation of the interfering signal accurately represents the interfering signal component of the analog radio frequency signal.

The analog radio frequency signal may comprise a plurality of interfering signals, and the cancelling device may be adapted to receive a plurality of cancellation signals generated respectively based on representations of the plurality of interfering signals or models thereof.

A signal of interest within the band may have, for example, an amplitude $a_1$, an interfering signal within the band have an amplitude $a_2$, wherein $a_2 > a_1$, the cancellation signal having an amplitude $a_2'$, wherein the cancelling device produces an analog difference signal represented by $a_1 + |a_2 - a_2'|$, and the digitizing device has a saturation level of less than $a_2$ and greater than $a_1$.

The signal to interferer ratio of the modified analog radio frequency signal over the analog radio frequency signal is preferably increased by at least 30 dB, and more preferably by at least 40 dB.

A digitizing device is may be provided to digitize the modified signal, for example having a sampling rate of at least 2 gigasamples per soend, and more preferably at a rate of at least 20 gigasamples per second.

A digital correlator may be provided to determine a time characteristic of the interfering signal, and wherein based on the determined time characteristic at least a relative delay of the cancellation signal is controlled to produce destructive interference between the cancellation signal and the interferer signal.

The signal of interest may be contained within a band comprising a frequency in excess of 500 MHz. The signal of interest may be a signal having a bandwidth of at least 18 MHz, i.e., that information bearing components of a signal are separated by at least 18 MHz within a single transmission. Larger bandwidths, such as 40 or 100 MHz are possible, and bandwidths extending over 400 MHz can be processed as well.

The apparatus may further comprise an element through which the modified analog radio frequency signal is processed, having an associated non-linear distortion, wherein the cancellation signal improves a signal to noise and distortion ratio of the processed modified analog radio frequency signal.

These and other objects, which are not limiting on the scope of the invention, and provided for exemplary purposes, will become apparent from a review of the detailed description and figures.

DETAILED DESCRIPTION OF THE PREFERRED EMBODIMENTS

Figure 1:
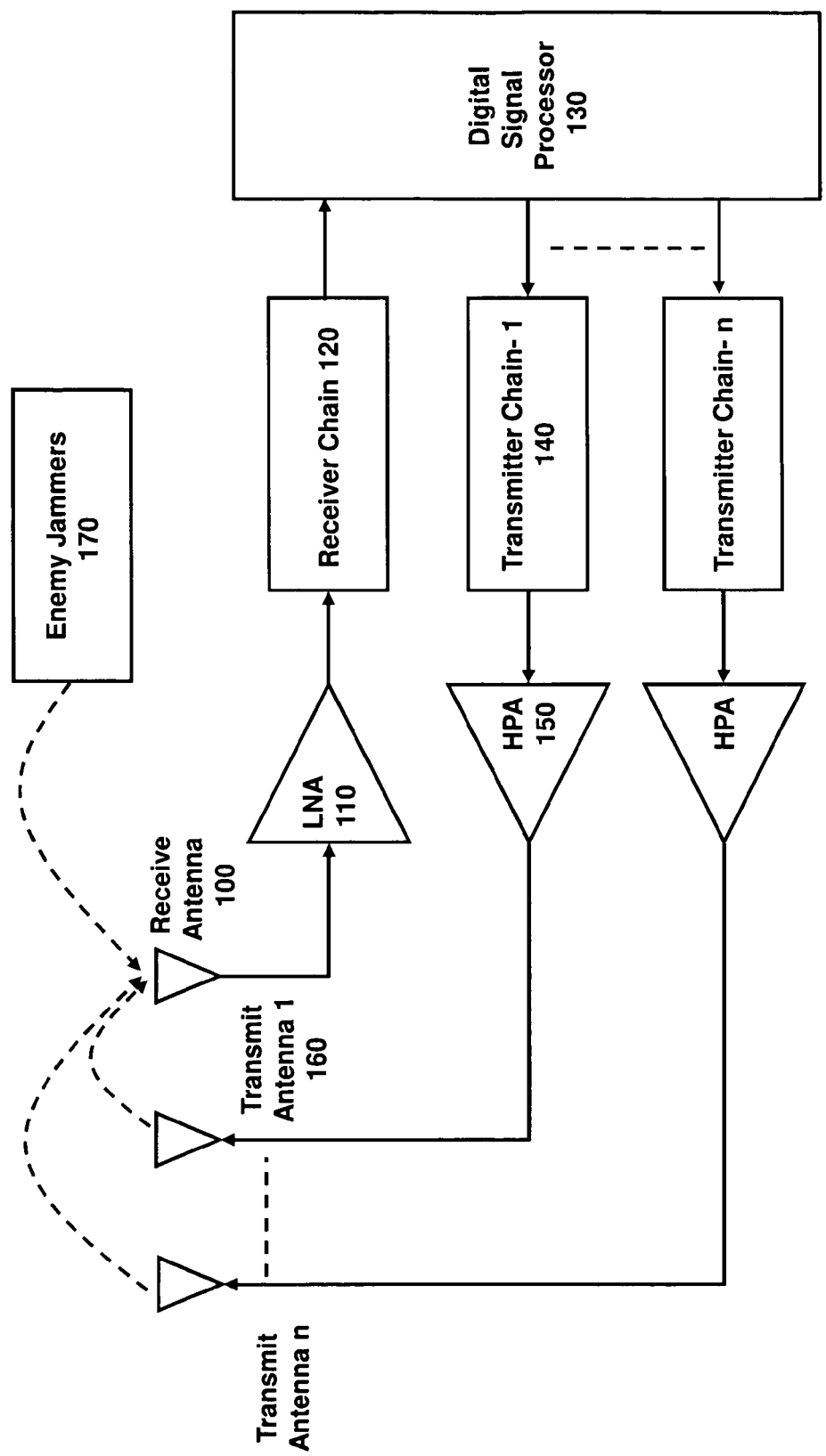
FIG. 1 shows a block diagram of an RF receiver in close proximity to multiple RF transmitters, in which part of the signal from the transmitters is coupled to the receiver antenna, leading to consumption of receiver dynamic range.

A typically encountered problem is presented in FIG. 1. A radio communication system comprises both a receiver and a transmitter (FIG. 1), which are typically located near each other (co-located or co-site), The radio receiver antenna 100 receives not only the desired signal, but also undesired interfering signals broadcast from one or more nearby transmit antennas 160, and potentially even deliberate jamming signals 170. The receiver is, of course, designed to detect weak signals, with a low-noise amplifier LNA 110 and a sensitive receiver chain 120, finally ending with baseband signals that may be converted to digital form and processed by a digital signal processor 130. In contrast, the transmitter chain 140 generates large signals which are amplified in a high-power amplifier HPA 150. Even a small fraction of the large transmit signal can saturate elements within the receiver. The receiver, including but not limited to the LNA 110, has an amount of nonlinearity which may give rise to intermodulation distortion, and thus spurs from interfering signals.

Figure 2B:
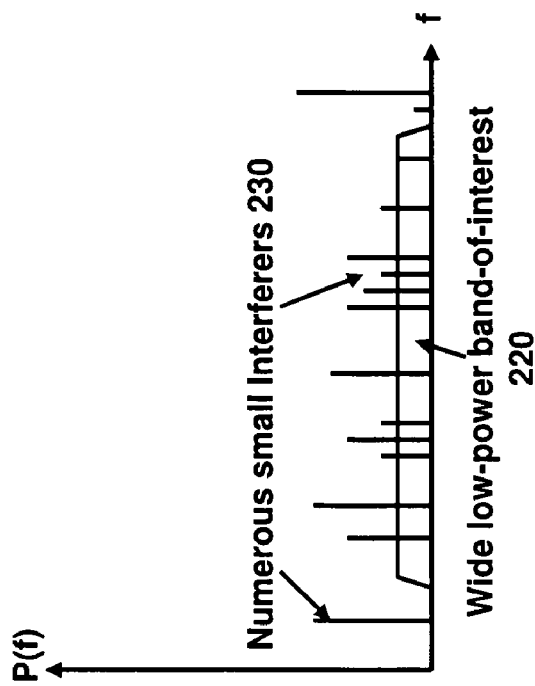
FIGS. 2A and 2B show respectively two interference scenarios; a few large interferers interspersed with narrow bands-of-interest, and numerous small interferers overlapping with a low-power wideband waveform.
Figure 2A:
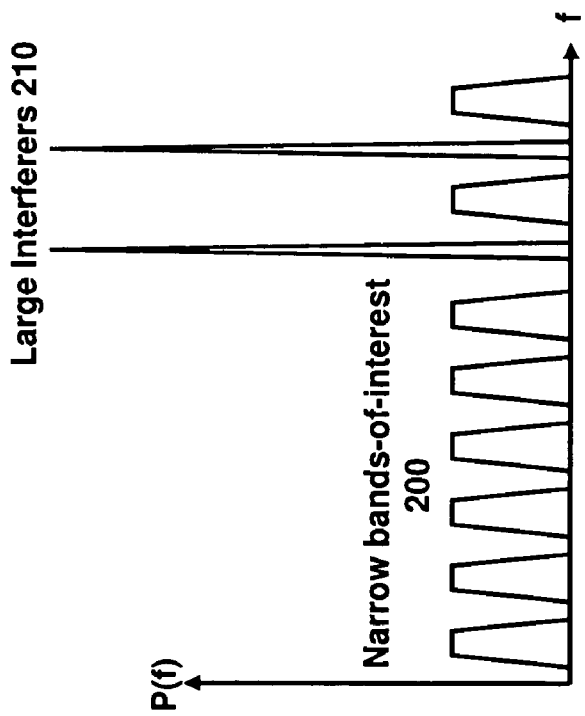

FIGS. 2A and 2B present examples of the power spectral density P(f) comprising both the signal(s) of interest and larger interferers. One or more large interferers 210 tend to generate intermodulation spurs and/or saturate the quantizer front end of a digital radio system (see FIG. 2A), and while one approach is to filter these large signals from the received signal spectrum P(f), that approach is limited when multiple interferers 230 overlap a wide low power band of interest 220, as shown in FIG. 2B. Multiple transmitters make the problem even worse. These high power transmit signal interferences result in reduction in a spur-free dynamic range and/or saturation of the otherwise high dynamic range receiver. While one common sense approach to this problem is to physically separate the receive antenna from the transmit antenna, on platforms such as aircraft, helicopters, spacecraft, ships, and building tops, such a solution may not be possible. The problem is further aggravated by the fact that the military tactical communication systems are rapidly migrating towards wide bandwidths (hundreds of MHz to a few GHz), supporting multiple narrowband and broadband waveforms. As a consequence, the number of interferers in the wide receive band continue to rise. Co-site interference manifests itself in three forms:

1. Small signal of interest in the presence of large interfering signal;
2. Small signal of interest in the presence of a large number of signals of comparable power; and
3. Impulsive interference from hoppers.

The worst problems tend to occur through a large in-band interferer that drives the receiver into saturation. That is, some electronic circuits have a distortion which increases with signal amplitude, and thus larger signals can produce exponentially more distortion than smaller ones. This creates non-linear distortions or spurs, preventing detection of much smaller signals-of-interest. Spurs also occur from in-band intermodulation products from large out-of-band interferers. The presence of these spurious signals and other interferers prevents full usage of the receiver spectrum. For example, to meet a particular SFDR requirement, e.g., to properly demodulate a signal within specification, the bandwidth of the receiver may be limited based on the existence of relatively high amplitude spurs at the edge of the band. All these effects severely limit functionality of RF receivers. The following difficulties arise from the inability of current communication systems to reject, cancel, or tolerate interference:

Poor spectrum efficiency and wasted available spectrum leads to compromise of information capacity.

The number of frequency hoppers supported on a platform is limited, resulting in fewer channels of secure, jam-resistant communication.

Small signals-of-interest cannot be detected, therefore low-probability of intercept signaling is affected.

Degraded signal detection and characterization permits complex signals to go undetected, and results in shorter communication range.

Dynamic frequency and bandwidth allocation schemes are very limited or not permitted, leading to longer operational planning time and reduced agility in battle situations.

The situation is even worse for surveillance (e.g. signal intelligence or "SIGINT") receivers. These very wide-band receivers, attempting to listen for weak signals, can be rendered useless by large co-site interferers. Often one has to resort to the extremely undesirable solution of shutting down the SIGINT receiver for short periods of time to combat the self-jamming from co-located high-power transmitters, compromising the effectiveness of the entire system.

To maximize the utilization of dynamic range, it is preferable to have an interference-free architecture where all the sources of interference are eliminated before they reach the receiver. Since the conventional method of bandpass filters is generally unable to achieve the desired levels of accuracy, it is preferred to have an interference cancellation architecture, where a copy or representation of the interference signal, equal in amplitude but of reversed polarity (called the cancellation signal) is added to the received signal. In effect, the interference signal and cancellation signal are nulled, leaving the desired signal to be digitized by the receiver.

Figure 3:
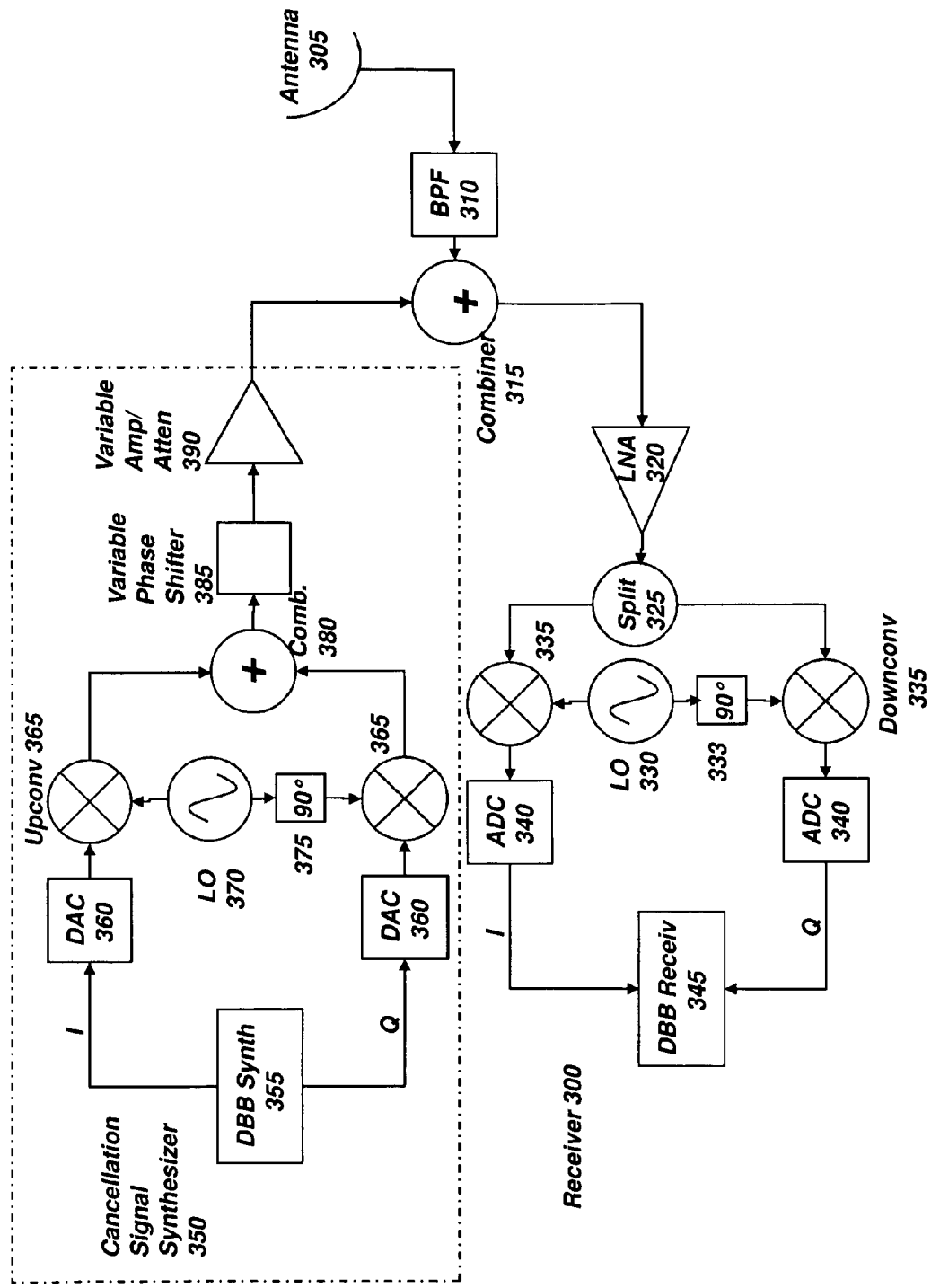
FIG. 3 shows a block diagram of a cancellation signal synthesizer of the prior art.

There are known approaches to active signal cancellation, of which the architecture in FIG. 3 is one example. This shows a conventional IQ (in-phase and quadrature) receiver 300, where the input signal to the antenna 305 comprises both the desired RF signal and a larger interfering signal. This signal passes through a bandpass filter 310, and is combined (added) in a combiner 315 with a cancellation signal generated by the Cancellation Signal Synthesizer 350, indicated by the dashed box in FIG. 3. This synthesizer is designed similarly to a conventional IQ transmitter (and indeed, in some cases a transmit signal can be used directly, reducing required hardware components), with variable phase shifter 385 and variable amplifier/attenuator 390 adjusted to cancel the interferer to the greatest degree in the combined signal that goes toward the LNA 320. Note that both the receiver and the cancellation synthesizer are largely analog, with the only digital processing occurring at baseband. This architecture works well when the interferer is a single static narrow-band signal. However, this approach is much less effective when there are multiple or dynamically changing interferers covering a wide band, particularly if the band covers an octave or more in frequency. In particular, phase shifts are not well defined across a broad band; one needs to deal with true time shifts instead.

Figure 4:
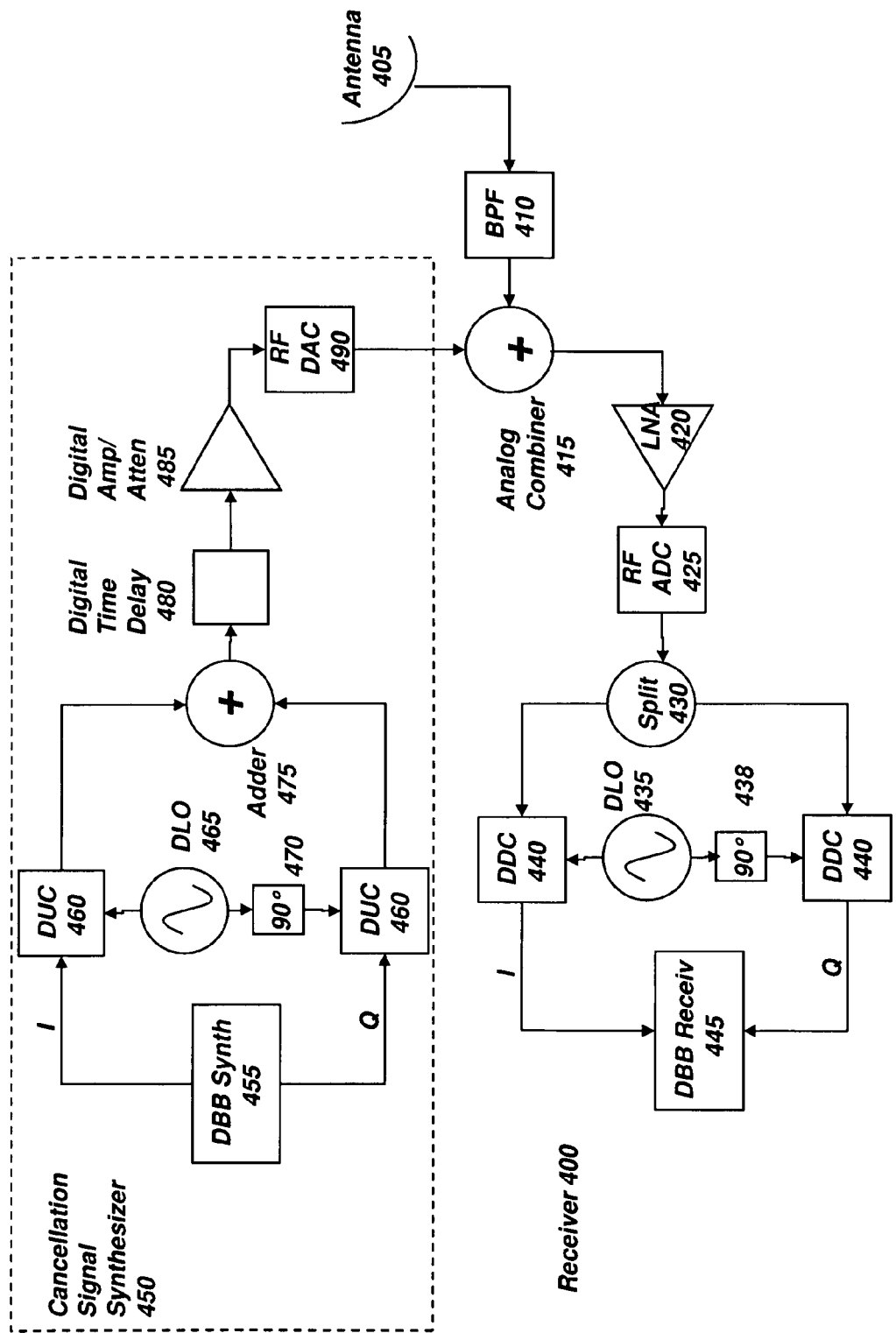
FIG. 4 shows a block diagram of a cancellation signal synthesizer of the present invention.

A typical architecture of the current technology is presented is FIG. 4. This approach carries out most of the processing in the digital domain using oversampled signals, and is intrinsically broad band. For example, the receiver 400 converts the analog signal to digital immediately after the LNA 420, using an RF ADC 425 that samples at multi-gigahertz frequencies. This ADC 425 is, for example, an RSFQ delta-sigma converter. Such a converter may operate, for example, at 40 gigasamples per second, or higher. This digital signal is then split digitally using a digital splitter 430 and directed to the I and Q channels. The down-conversion is carried out using a digital local oscillator DLO 435 and a 90-degree digital phase shifter 438 together with a pair of digital downconverters (DDC 440) that generate a digital baseband signal for the digital baseband receiver 445. Further, the Cancellation Signal Synthesizer is also fully digital, using another DLO 465 and 90-degree phase shifter 270 and a pair of digital upconverters 460 that operate at multi-giga-hertz rates. As shown in FIG. 4, key elements of this basic approach are a digital time delay 480 and a digital amplitude adjuster 485. Finally, the Digital-RF™ signal is converted to analog using an RF DAC 490. This analog RF cancellation signal is combined with the signal from the antenna in an analog combiner (adder) 415, to yield the residual receive signal. The residual receive signal may be analyzed based on the digital baseband signal, and used to control the Cancellation Signal Synthesizer, for example to adjust the digital time delay 480 and the digital amplitude adjuster 485. In addition, in some cases, the residual receive signal may include a complex correlated interference pattern. After a highest amplitude component of the signal is modeled, the residual receive signal may be analyzed for correlated interference, which may be used to adjust a digital lookup table, which is then used based on the DLO 435 to generate a better analog cancellation signal, e.g., one that results in a residual receive signal with a lower amount of interference-derived power.

It is to be understood that the interference cancellation approach of FIG. 4 can be directly extended to the synthesis of multiple interfering signals, or equivalently a broadband interfering signal that comprises the sum of several such signals, where such combination may be implemented in digital or analog domains.

This simple looking approach necessitates ultrafast digital electronics that allows high precision gain matching and true-time delay adjustment for frequency independent subtraction of the interfering signal. Digital-RF™ technology, realized today with ultrafast superconductor electronics, is an ideal candidate to perform a wideband interference cancellation. Below the desired features for an interference-free architecture are tabulated along with the proposed solutions. However, it is noted that depending on the required performance, other technologies may be used to implement the system.

Figure 5:
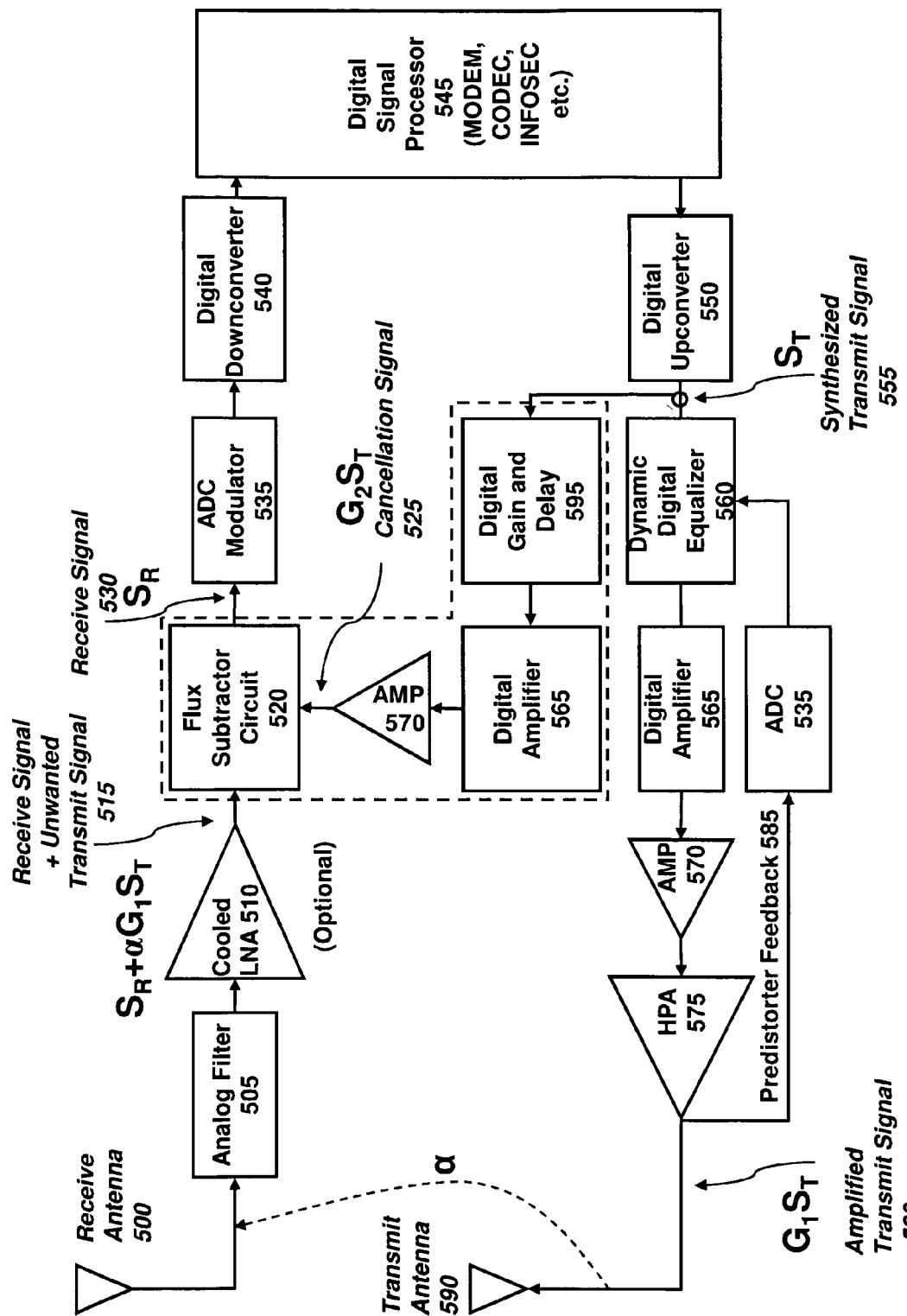
FIG. 5 shows a block diagram of a static signal canceller utilizing Digital-RF™ gain and true time delay components for frequency-independent subtraction.

A preferred implementation of the present technology for cancelling co-site interference using superconducting technology is presented in FIG. 5. Here, the ultrafast digital processing may be carried out using Niobium superconducting integrated circuits cooled to deep cryogenic temperatures near 4 K, using a cryocooler. The receive antenna 500 also receives a small fraction a of the signal transmitted by the transmit antenna 590, which represents interference which should be cancelled by a cancellation signal from the cancellation synthesizer. The bandpass filter 505 and LNA 510 may be implemented using components cooled to an intermediate temperature of about 70 K, also available from the same cryocooler. The filter may be comprised of high-temperature superconductors (such as cuprate materials), and the LNA may be optional, depending on the strength of the input signal. These cooled receiver components should permit reduced noise and hence higher receiver sensitivity. At the output of the LNA, the RF signal 515 can be expressed as $S_R + \alpha G_1 S_T$, where $S_R$ is the desired receive signal, and $\alpha G_1 S_T$ is the interference signal. This signal then goes to the Flux Subtractor Circuit 520, where it is combined with the Cancellation Signal 525. The Flux Subtractor Circuit represents a superconductor implementation of the Analog Combiner 415 in FIG. 4. (That this is identified as a Subtractor rather than an Adder is immaterial, since one can merely switch the terminals of a transformer coil in FIG. 6.) If the gain and timing of the Cancellation Signal 525 in FIG. 5 are adjusted correctly, then the Cancellation Signal $G_2 S_T$ should cancel the signal coupled from the transmitter, resulting in the desired receive signal 530 as simply $S_R$.

Note that the Receive Signal 530 is immediately converted to a Digital-RF™ signal by ADC 535, before downconversion using a Digital Downconverter 540, as shown by RF ADC 425 in FIG. 4. FIG. 5 is simplified, and does not explicitly show a digital IQ receiver with a two-phase IQ digital local oscillator as in FIG. 4, but this is a known technique in Digital-RF™ receivers, which is implied. Similarly, the Digital-RF™ transmitter in FIG. 5 also shows a digital upconverter 550, with a two-phase digital local oscillator as in FIG. 4 implied but not explicitly shown. The transmitter in FIG. 5 also shows a Digital-RF™ predistorter circuit (the dynamic digital equalizer block 560) that digitally compensates for nonlinear distortion in the amplifier chain (digital amplifier 565, analog amplifier AMP 570, and high power amplifier HPA 575), where the compensation may be dynamically adjusted by sampling the transmitted output using Predistorter Feedback circuit 585. This is similar to that described in more detail in U.S. Pat. No. 7,313,199, expressly incorporated herein by reference. Assuming that most of the nonlinear distortion in FIG. 5 may be associated with HPA 575, the Synthesized Transmit Signal 555 samples the Digital-RF™ signal before predistortion. The amplitude and timing of this Synthesized Cancellation signal may be digitally adjusted in the Digital-RF™ Gain and Delay module 595, before being further amplified in digital amplifier 565 and AMP 570. In the present example, it is assumed that these adjustments may be essentially static, given a fixed coupling between the transmitter and the receiver.

Note also that the RF-DAC 490 in the transmitter and the synthesizer of FIG. 5 are not explicitly shown. In one implementation, the Digital-RF™ signal may be, for example, a fast oversampled sequence of single-bit pulses, and the conversion to analog may be obtained, for example, by low-pass filtering the single-bit pulsetrain before AMP 570 in both the transmitter and synthesizer. In another implementation, a multi-bit Digital-RF™ signal may be converted to an analog RF signal in a multi-bit RF DAC before AMP 570.

Figure 6:
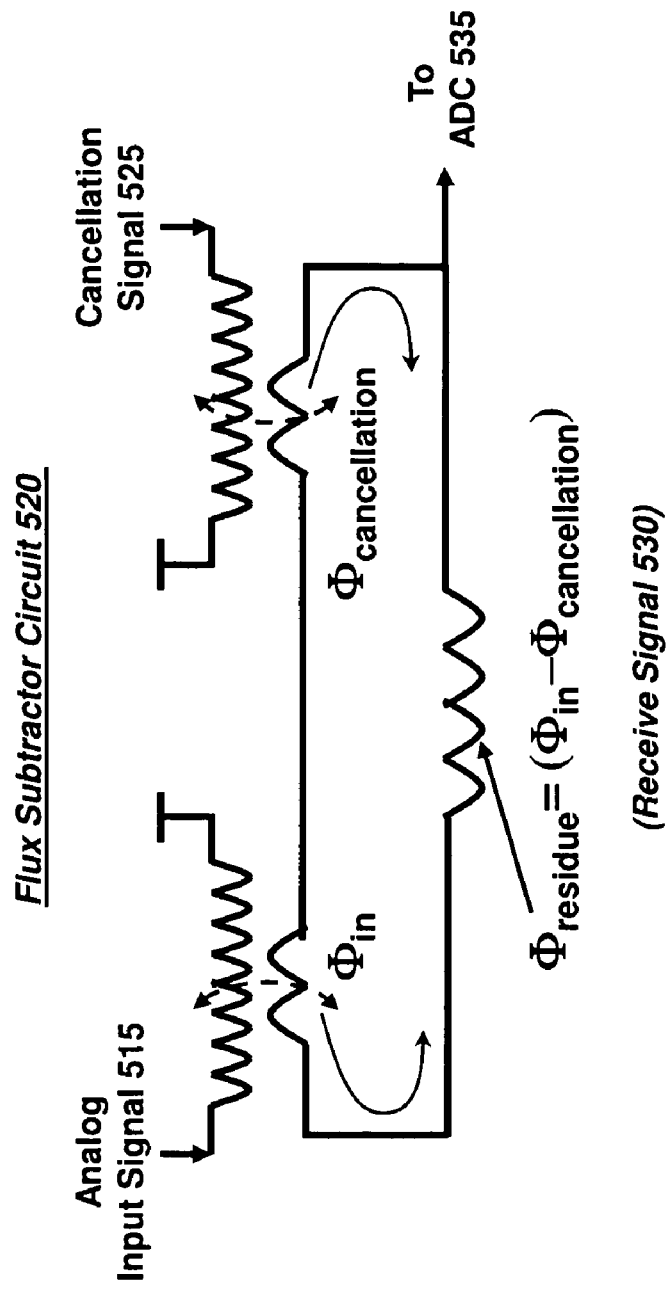
FIG. 6 shows a notional schematic of a flux subtractor circuit utilizing superconducting transformers to implement an interference cancellation architecture.
Figure 7:
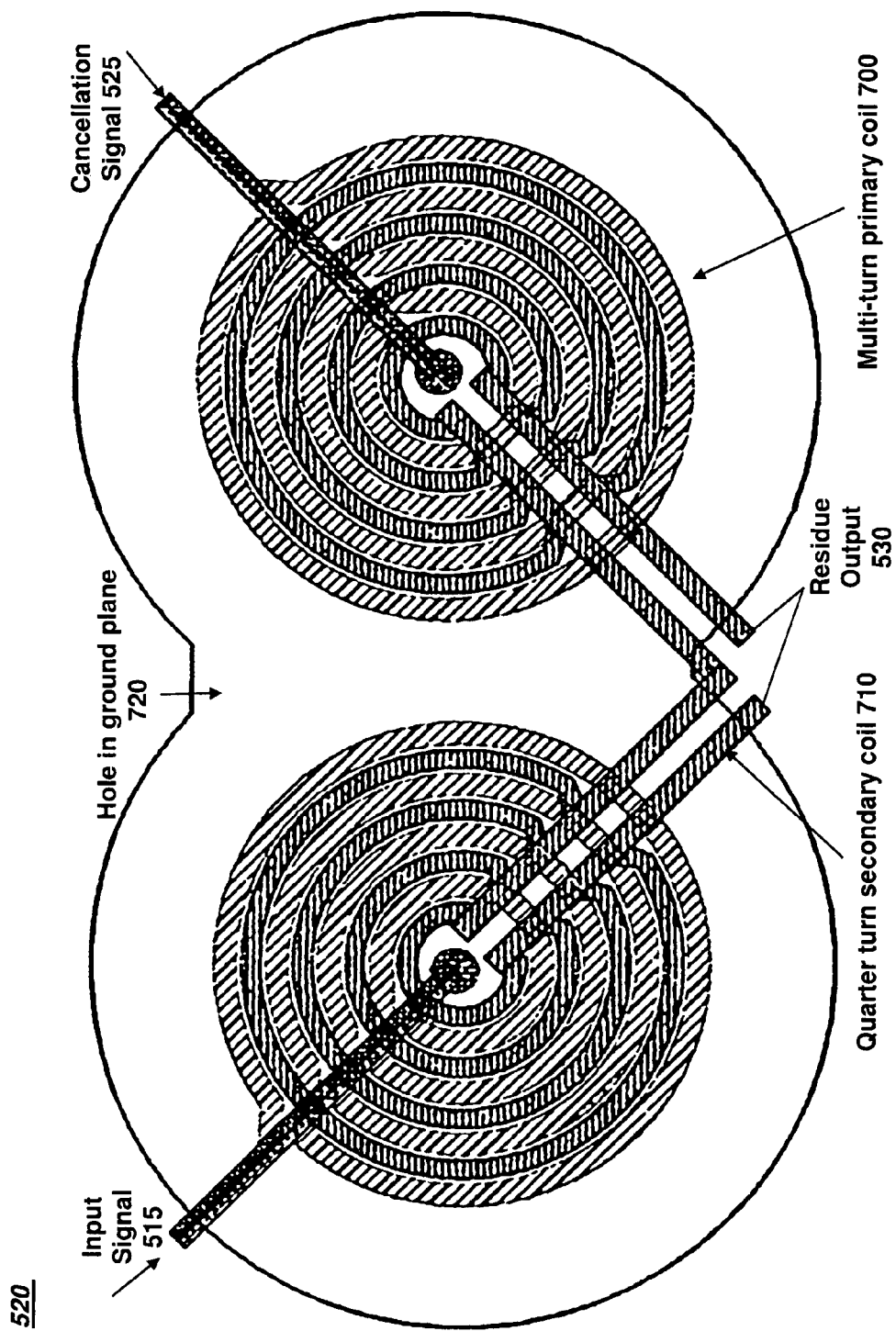
FIG. 7 shows a layout of a flux subtractor circuit with superconducting transformers for an interference cancellation architecture.

Wideband interference cancellation may thus be achieved through use of Digital-RF™, true time delay components for frequency independent subtraction. High precision gain matching may be achieved through digitally controlled gain, using a digital look-up table and digital amplifier for precise amplitude matching. An analog combiner 415 with linear phase response and optimal noise performance may be achieved through use of a Flux Subtractor 520, a device which uses passive superconducting niobium transformers for interference cancellation (FIGS. 6 and 7). Since the cryocooler operating at a temperature of 4 K is already present for the digital sampling and processing, this requires little additional hardware to take advantage of the low noise and ideal flux transfer characteristics of superconductors. As indicated in FIG. 7, this transformer structure may be implemented using a thin-film niobium process, using a multi-turn primary coil 700 and a quarter-turn secondary coil 710, with a hole in the superconductor ground plane 720 to enhance the mutual inductance between primary and secondary coils.

The design of a flux subtractor as shown in FIG. 7 (originally intended for a subranging ADC) has a limited current carrying capability and therefore may be suboptimal for certain transmit signal cancellation applications because of the potentially high power signals involved. Although superconductors themselves are capable of carrying large currents, the fabrication process preferably employed is a thin film process which necessitates large metal widths for transformer turns, to increase the current carrying capability. However larger metal widths increase the parasitic inductances and parasitic capacitances that may lower the cutoff frequency to only a few GHz. Therefore, the design shown is useful for a range of applications, but an optimized design or different design of the flux subtractor may be used for different regimes of operation, for example, large signal amplitude transmit signal cancellation. See, U.S. Pat. Nos. 6,509,853, 5,939,881; Mukhanov, O. A.; Gupta, D.; Kadin, A. M.; Semenov, V. K., "Superconductor analog-to-digital converters", Proceedings of the IEEE, Volume 92, Issue 10, October 2004 Page(s): 1564-1584, each of which is expressly incorporated herein by reference.

Figure 8:
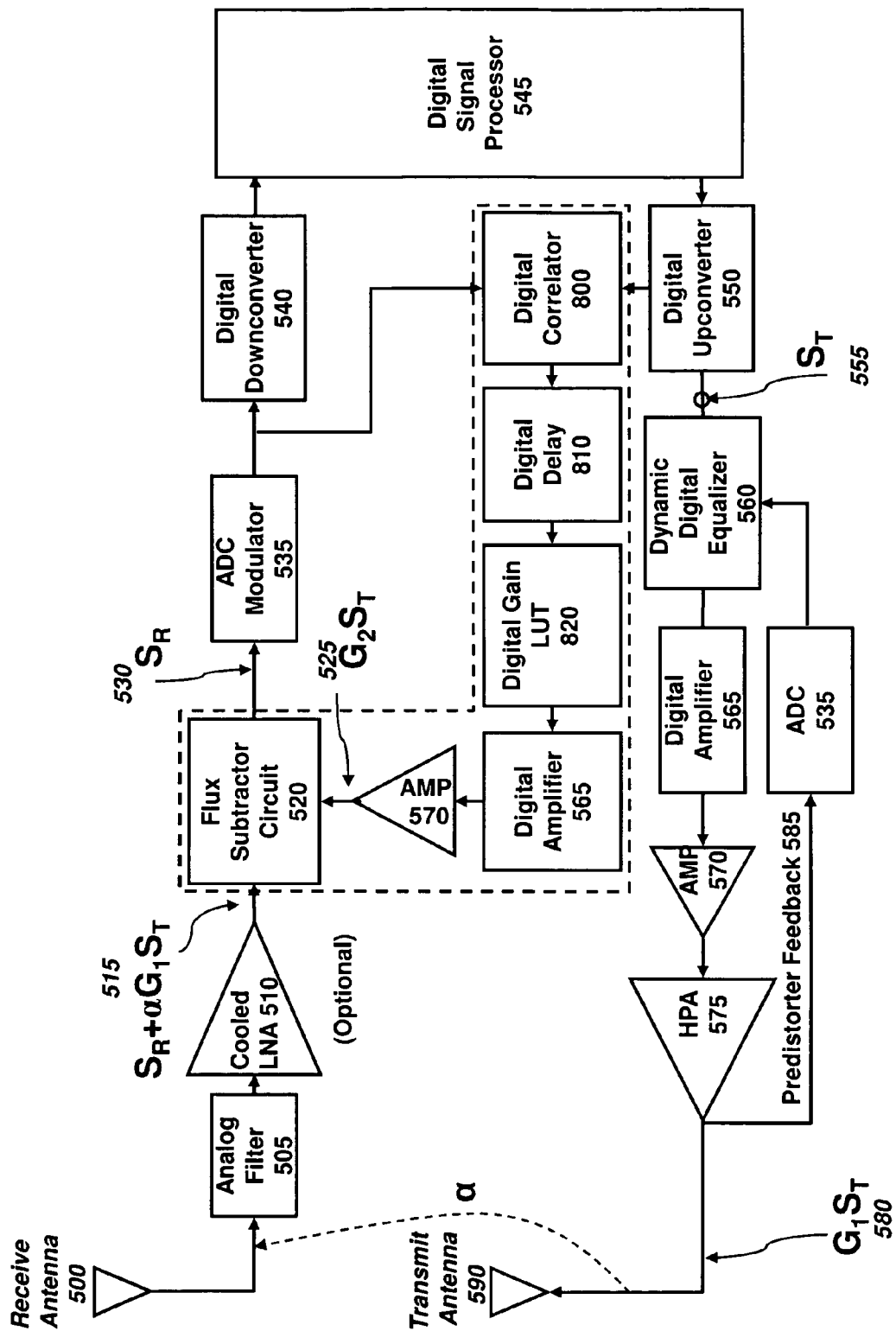
FIG. 8 shows a block diagram of a self-calibrating co-site interference cancellation architecture, in which a digital correlator cross-correlates the receiver output with a representation of the Digital-RF™ transmit signal to adjust the gain and delay of the cancellation signal.

While the static transmit signal cancellation architecture of FIG. 5 is successful to an extent in mitigating the co-site interference, it relies on manual calibration of delay and gain adjustment of the cancellation signal. Any mismatches in the delay and gain adjustment directly affect the accuracy of cancellation. Moreover, the static cancellation architecture is largely insensitive to the environmental changes which necessitate periodic calibration of the delay and gain of the cancellation signal. The self-calibrating interference cancellation architecture of FIG. 8 is a further improved architecture that overcomes the limitations of the static interference cancellation architecture for co-site interference.

Active self-calibrating cancellation may be achieved through use of a Digital Correlator 800, which correlates receiver output with a source of interference for gain and phase matching of the cancellation signal. This uses Digital-RF™ cross-correlation at multi-GHz frequencies, as described in U.S. Pat. No. 7,280,623, expressly incorporated herein by reference. The correlator approach of FIG. 8 may also be extended as in FIG. 9 to multiple interference adaptive cancellation and Enemy jammer interference cancellation through digitally controlled cancellation, with individual self-calibrated subtraction for each source of interference. This may include correlation of receiver output to waveforms from a template library (910), to cancel known external sources of interference. As discussed above, a template stored in a rewritable lookup table (for example, implemented with RSFQ non-destructive readout (NDRO) cells) may also be adaptively defined to reduce the power associated with the interference in the residual receive signal.

In one embodiment of the technology, the interference problem is analyzed to identify the multiple sources of interference and a system architecture is provided to adaptively cancel all substantial sources of interference with a high precision canceller; thereby enabling detection of weak signals at the environmental noise limit. Typically, the interferer model must produce a cancellation signal in real time, since faithful storage of the received signal with the interferer present, and then later analyzing the stored signal to eliminate the effects of interference is generally untenable. Therefore, in the case of dynamic interferers, a model of the interferer must respond immediately, or nearly so, to changes in the interferer signal.

It is noted that, in similar fashion to interference cancellation, the technique may also be used to increase the effective dynamic range of the receiver for signals of interest. That is, if strong signal components of the signal of interest can be modeled and cancelled, the receiver dynamic range can then be allocated to the difference signal, i.e., received spectrum absent the predicted signal(s) of interest. Thus, weak, closely spaced, sideband signals can be demodulated in the presence of a strong carrier signal Likewise, in some cases, a signal of interest may act as an interferor to another signal of interest. In that case, the cancellation of a signal of interest early in the receiver signal chain is preferably associated with digital logic in the receiver to reconstruct or correct the cancelled signal later for appropriate analysis and/or demodulation.

In the embodiment shown in FIG. 8, the ADC modulator 535 output is cross-correlated with the Digital-RF™ transmit signal 555 in a digital correlator 800. The output of the digital correlator specifies the amount of transmit signal interference carried to the receiver. This correlated output can be iteratively used to adjust the gain and delay of the cancellation signal until high precision interference rejection is achieved.

A programmable digital delay 810 using shift registers can be used to precisely match the delay, and a digital look-up table 820 can be used to modify the gain. The lookup table may store data representing a sine wave, to cancel a narrowband signal, or in some embodiments, the lookup table may also define a waveform different than a sine wave. The input to the look-up table is the n-bit digital word, which serves as an address for the corresponding output word. For each of the N ($=2^n$) possible numbers, the look-up table will have stored an (n+m)-bit word. The additional m-bits allow adjustment of gain of the cancellation signal. The number of bits in the look-up table would determine the precision of adjustment that can be accomplished. An interface block between the correlator and the look-up table (not shown in FIG. 8) may be provided to perform or control a self-calibration of the gain and delay of the cancellation signal. The self-calibration procedure consists of an adaptive algorithm that can be used to calculate the accuracy of cancellation from the cross-correlated outputs and accordingly make corrections to the delay and gain adjustment by providing appropriate inputs to the programmable delay and digital look-up table. This process of self-calibration is continuous, thereby achieving enhanced immunity to environmental changes to deliver high precision interference cancellation.

In a system with multiple transmitters on a common platform, a part of transmit energy from all collocated transmitters is coupled to the receive antenna. Apart from the co-site interferers from Transmit Antennas 590, there may be other sources of interference 900 (with signal contribution βI to Receive Antenna 500), such as a jamming signal from the enemy, which can saturate the receiver or produce distortion, and degrade the system performance to unacceptable levels. In order to have a sufficiently interference-free architecture, all significant sources of interference should be identified and appropriate cancellation provided for each significant source. This may necessitate generation of multiple cancellation signals, each with its appropriate gain and delay matching.

Figure 9:
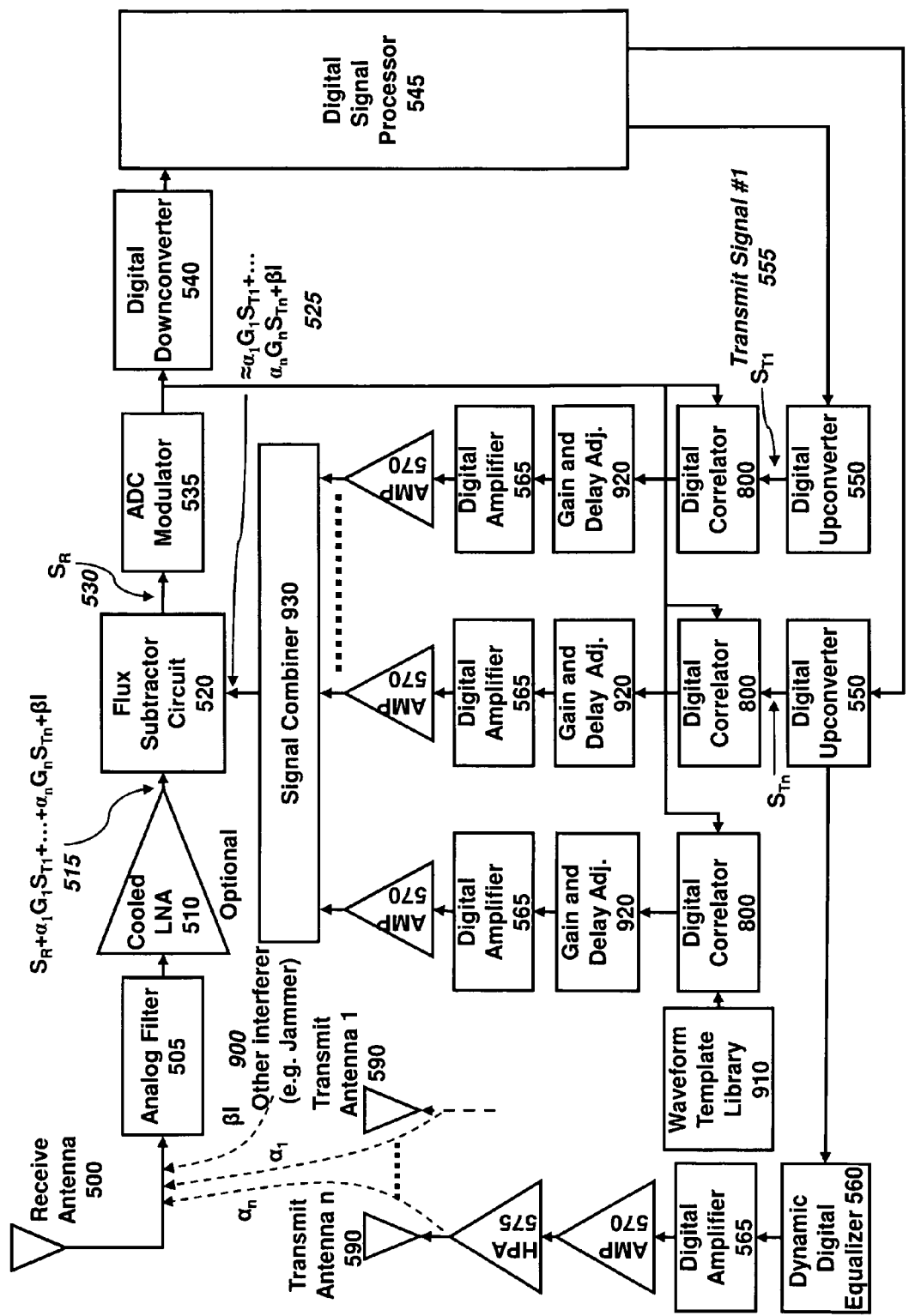
FIG. 9 shows a block diagram of a multiple interferer adaptive cancellation architecture which provides individual self-calibrated subtraction for various sources of co-site interference, employing a template library and multiple correlators.

FIG. 9 shows such a multiple interferer adaptive cancellation architecture. $S_{T1}$ to $S_{Tn}$ are the Digital-RF™ transmit signals of the n co-located transmitters. Each of these transmit signals is digitally correlated with the receiver output to calculate the part of individual transmit signal being coupled to the receiver.

The output of the correlator determines the gain and delay compensation for individual transmit cancellation paths. The receiver output is also correlated with existing waveforms in the template library to identify other source of interference like enemy jammers, and appropriate compensation is provided to cancel out the interference. All the Digital-RF™ cancellation signals for individual sources of interference are either summed together digitally (in a digital combiner, not shown) or converted to analog and summed together in an analog signal combiner 930, and are subtracted from the received signal in the flux subtractor 520.

Depending on the cross correlator output, the process iteratively adjusts the delay and gain of the cancellation signal in the individual subtraction paths. Consequently, the process adaptively achieves high precision interference cancellation. The waveform template library 910 can be periodically updated with known sources of interference.

The high dynamic range analog to digital converter (ADC) utilizing large signal subtraction or cancellation addresses one of the major problems of modern SIGINT systems—large co-site interference. It is especially challenging for RF designs that seek to meet the requirements for high dynamic range in a wideband system. It is capable of removing the highest level signals (including agile emitters) while preserving the system's minimum detectable signal thresholds. It also provides methods of protection of sensitive amplifiers and components that are well tested, and minimize re-radiation back through the antenna. The overall architecture is consistent with existing SIGINT systems that divide the band into segments and apply design solutions specific to those frequency segments. The proposed solution further permits the use of legacy experience in dealing with high power in-band and out-of-band interferers.

The present technology provides a way to achieve a high spur-free dynamic range (SFDR) direct RF receiver that enables accurate detection of small signals by providing enhanced immunity to high power in-band (or out of band) interference. Exploiting the high spur-free dynamic range of the analog-to-digital converter front-end, the system can discriminate smaller signals with a superconductor receiver, while simultaneously digitizing much larger signals. A superconducting delta-sigma ADC has demonstrated a 104 dB SFDR in 10 MHz instantaneous bandwidth. The present technology seeks to extend the effective dynamic range further, well beyond what any other known technology can achieve.

INDEX OF REFERENCE NUMBERS

100 Receive Antenna
110 Low Noise Amplifier LNA
120 Receiver Chain
130 Digital Signal Processor
140 Transmitter Chain
150 High Power Amplifier HPA 160 Transmit Antenna
170 Enemy Jammers
200 Narrow Bands of Interest
210 Larger Interferers
220 Wide Low-Power Band of Interest
230 Multiple Small Interferers
300 Receiver
305 Antenna
310 Bandpass Filter BPF
315 Cancellation Combiner
320 Low Noise Amplifier LNA
325 IQ Splitter
330 Local Oscillator LO
333 90-degree Phase Shifter
335 Downconverter (Mixer)
340 Basedband Analog-to-Digital Converter ADC
345 Digital Baseband DBB Receiver
350 Cancellation Signal Synthesizer
355 Digital Baseband DBB Synthesizer
360 Baseband Digital-to-Analog Converter DAC
365 Upconverter (Mixer)
370 Synthesizer Local Oscillator LO
375 Synthesizer 90-deg. Phase Shifter
380 IQ Combiner
385 Variable Phase Shifter
390 Variable Amplifier/Attenuator
400 Digital-RF™ Receiver
405 Antenna
410 Bandpass Filter BPF
415 Analog Combiner
420 Low-noise Amplifier LNA
425 RF Analog-to-Digital Converter ADC
430 Digital Splitter
435 Digital Local Oscillator LO
438 Digital 90-deg. Phase Shifter
440 Digital Downconverter DDC
445 Digital Baseband DBB Receiver
450 Digital-RF™ Cancellation Signal Synthesizer
455 Digital Baseband DBB Synthesizer
460 Digital Upconverter DUC
465 Digital Local Oscillator DLO
470 Digital 90-deg. Phase Shifter
475 Digital-RF™ Adder
480 Digital-RF™ Time Delay
485 Digital-RF™ Amplifier/Attenuator
490 RF Digital-to-Analog Converter DAC
500 Receive Antenna
505 Analog Filter
510 Cooled LNA
515 Receive Signal+Unwanted Transmit Signal
520 Flux Subtractor Circuit
525 Cancellation Signal
530 Analog Receive Signal
535 ADC Modulator
540 Digital Downconverter
545 Digital Signal Processor
550 Digital Upconverter
555 Synthesized Digital-RF™ Transmit Signal
560 Dynamic Digital Equalizer
565 Digital-RF™ Amplifier
570 Analog Amplifier AMP
575 High-Power Amplifier HPA
580 Amplified Transmit Signal
585 Predistorter Feedback
590 Transmit Antenna
595 Digital-RF™ Gain and Delay
700 Multi-turn Primary Coil for Flux Subtractor
710 Quarter-turn Secondary Coil
720 Hole in Ground Plane for Flux Subtractor
800 Digital-RF™ Correlator
810 Digital-RF™ Delay
820 Digital-RF™ Gain Lookup Table LUT
900 Other Interferer (e.g., Jammer)
910 Digital-RF™ Waveform Template Library
920 Digital-RF™ Gain and Delay Adjustment
930 Analog Signal Combiner

What is claimed is:

1. A receiver having at least one non-linear component, comprising:

an input configured to receive a radio frequency input signal having at least one signal of interest and at least one radio frequency signal component which is at least one of:

having an amplitude sufficient to saturate a saturable element; or distorted by the at least one non-linear component to generate at least one distortion component having a distortion amplitude;

a digital signal generator, configured to produce an oversampled digital representation of the at least one radio frequency signal component;

a digital to analog converter, configured to produce a radio frequency analog signal corresponding to the oversampled digital representation of the at least one radio frequency signal component, and being controlled with respect to at least a relative time delay with respect to the at least one radio frequency signal component; and a component configured to receive the radio frequency input signal substantially without non-linear distortion and the radio frequency analog signal, and to cancel the at least one radio frequency signal component from the radio frequency input signal, to produce a modified radio frequency signal in which a residual portion of the radio frequency signal component does not saturate the saturable element or is associated with a distortion amplitude of the at least one distortion component reduced by at least 3 dB, and the signal of interest is substantially unmodified with respect to a modified radio frequency signal produced if the radio frequency analog signal has zero amplitude.

2. An interfering signal cancellation apparatus, comprising:

an input configured to receive an analog radio frequency signal within a band comprising a signal of interest having a signal amplitude, and an interferer signal having an interferer signal amplitude;

a signal generator configured to generate a cancellation signal based on an oversampled digital representation of at least the interferer signal; and a cancelling device configured to receive the analog radio frequency signal and the cancellation signal and to produce a modified analog radio frequency signal therefrom, wherein the modified radio frequency signal is substantially without non-linear distortion components derived from the analog radio frequency signal or the cancellation signal, wherein the signal generator produces the cancellation signal having a relative timing and relative amplitude configured to increase a signal to interferer amplitude ratio of the modified analog radio frequency signal over the analog radio frequency signal by at least 20 dB.

3. The apparatus according to claim 2, wherein the cancelling device is configured to operate by coupling magnetic fields associated with the analog radio frequency signal and the cancellation signal.

4. The apparatus according to claim 2, wherein the cancelling device comprises a superconductor.

5. The apparatus according to claim 2, wherein the cancelling device is configured to increase the signal to interferer ratio of the modified analog radio frequency signal over the analog radio frequency signal by at least 30 dB.

6. The apparatus according to claim 2, wherein the cancelling device is configured to increase the signal to interferer ratio of the modified analog radio frequency signal over the analog radio frequency signal by at least 40 dB.

7. The apparatus according to claim 2, wherein the signal generator is configured to generate the cancellation signal based at least in part on an output of a digital correlator configured to accept samples at a rate above a Nyquist rate for the received analog radio frequency signal.

8. The apparatus according to claim 2, further comprising a digitizing device configured to produce a digital output representing the modified analog radio frequency signal at a rate of at least 2 gigasamples per second.

9. The apparatus according to claim 8, wherein the digitizing device is configured to sample the modified analog radio frequency signal at a rate of at least 20 gigasamples per second.

10. The apparatus according to claim 2, wherein a digital correlator is provided, configured to determine a time characteristic of the interfering signal, and wherein the signal generator is configured to produce destructive interference between the cancellation signal and the interferer signal based on the determined time characteristic at least a relative delay of the cancellation signal.

11. The apparatus according to claim 2, further comprising a lookup table configured to represent a digital model of the interferer signal, and the signal generator is configured to generate the cancellation signal in dependence on the represented digital model.

12. The apparatus according to claim 2, wherein a source of an interferer signal is cooperative with the apparatus, further comprising an input configured to receive a representation of the interferer signal from the source of the interferer signal, for use in generating the cancellation signal.

13. The apparatus according claim 12, wherein the input is configured to receive the representation of the interferer signal as a digital signal.

14. The apparatus according claim 12, wherein the input is configured to receive the representation of the interferer signal in analog form.

15. The apparatus according to claim 12, wherein a source of the interferer signal comprises a digital synthesizer configured to provide the representation of the interferer signal to the input as a digital representation, and further comprises an analog feedback device having an analog-to-digital converter configured to ensure that the digital representation of the interferer signal accurately represents the interfering signal component of the analog radio frequency signal.

16. The apparatus according to claim 2, wherein the analog radio frequency signal comprises a plurality of interferer signals, and the cancelling device is configured to receive a plurality of cancellation signals generated respectively based on representations of the plurality of interferer signals or models thereof.

17. The apparatus according to claim 2, wherein the signal of interest has an amplitude $a_1$, the interferer signal has an amplitude $a_2$, wherein $a_2 > a_1$, the cancellation signal has an amplitude $a_2'$, wherein the cancelling device produces an analog difference signal represented by $a_1 + |a_2 - a_2'|$, further comprising a digitizing device configured to receive the modified analog radio frequency signal having a saturation level of less than $a_2$ and greater than $a_1$.

18. The apparatus according to claim 2, wherein the signal of interest is within a band comprising a frequency in excess of 500 MHz, an entirety of which is received by the cancelling device.

19. The apparatus according to claim 2, wherein the signal of interest is a signal having a bandwidth of at least 18 MHz.

20. The apparatus according to claim 2, further comprising an element configured to process the modified analog radio frequency signal, having an associated non-linear distortion, wherein the cancellation signal improves a signal to noise and distortion ratio of the processed modified analog radio frequency signal.

21. A method for receiving, comprising:
receiving a radio frequency input signal having at least one signal of interest and at least one radio frequency signal component which is at least one of:
having an amplitude sufficient to saturate a saturable element of a receiver; or
distorted by the at least one non-linear component of the receiver to generate at least one distortion component having a distortion amplitude;
producing an oversampled digital representation of the at least one radio frequency signal component;
producing a radio frequency analog signal corresponding to the oversampled digital representation of the at least one radio frequency signal component, and having a relative time delay which is adjusted with respect to the at least one radio frequency signal component; and
cancelling at least a portion of the at least one radio frequency signal component from the radio frequency input signal to produce a modified radio frequency signal substantially without non-linear distortion, in which a residual portion of the radio frequency signal component does not saturate the saturable element or is associated with a distortion amplitude of the at least one distortion component reduced by at least 3 dB, and in which the signal of interest is substantially unmodified with respect to a modified radio frequency signal produced if the radio frequency analog signal has zero amplitude.

22. The method according to claim 21, wherein the modified radio frequency signal is produced by coupling magnetic fields associated with the radio frequency analog signal and the radio frequency input signal.

23. The method according to claim 21, wherein the receiver comprises at least one Josephson Junction acting as a saturable or non-linear element which receives the modified radio frequency signal.

24. The method according to claim 21, wherein a relative time characteristic of the radio frequency analog signal is adjusted in dependence on a digital correlator output.

25. The method according to claim 21, wherein the oversampled digital representation is generated based on a digital lookup table.

26. The method according to claim 21, wherein the radio frequency signal comprises a plurality of radio frequency signal components, and a corresponding plurality of oversampled digital representations are generated.

27. The method according to claim 21, further comprising digitally correlating the received radio frequency signal to determine a time characteristic of at least high amplitude periodic signal components of the at least one radio frequency signal component, and synchronizing the radio frequency analog signal to cause destructive interference of the at least high amplitude periodic signal components of the at least one radio frequency signal component.

28. The method according to claim 21, further comprising providing feedback for producing the radio frequency analog signal to ensure that the oversampled digital representation of the at least one radio frequency signal component accurately represents the at least one radio frequency signal component of the radio frequency signal.

29. The method according to claim 21, wherein a largest amplitude one of the at least one signal of interest has an amplitude $a_1$, a largest amplitude one of the at least one radio frequency signal component has an amplitude $a_2$, wherein $a_2 > a_1$, the oversampled digital representation of the at least one radio frequency signal component has an amplitude $a_2'$, wherein the cancelling produces modified radio frequency signal as an analog difference signal represented by $a_1 + |a_2 - a_2'|$, further comprising receiving the modified radio frequency signal in a digitizing device having a saturation level of less than $a_2$ and greater than $a_1$.

30. The receiver according to claim 1, further comprising a broadband analog combiner configured to add the radio frequency input signal and the radio frequency analog signal.

31. The receiver according to claim 1, whereby the component comprises a magnetic flux subtractor.

32. The receiver according to claim 1, wherein the oversampled digital representation is sampled at a rate of at least 2 gigasamples per second.

33. The receiver according to claim 1, wherein the at least one radio frequency component is generated by a transmitter associated together with the receiver which together comprise a radio communication system.

34. The receiver according to claim 1, further comprising a digital correlator configured to determine a time characteristic of the at least one radio frequency signal component, and wherein the digital signal generator is configured to produce the radio frequency analog signal synchronized to cause destructive interference of at least high amplitude periodic signal components of the at least one radio frequency signal component.

35. The receiver according to claim 1, further comprising an analog-to-digital converter configured to provide feedback to the digital signal generator to ensure that the oversampled digital representation of the at least one radio frequency signal component accurately represents the at least one radio frequency signal component of the radio frequency signal.

36. The apparatus according to claim 1, wherein a largest amplitude one of the at least one signal of interest has an amplitude $a_1$, a largest amplitude one of the at least one radio frequency signal component has an amplitude $a_2$, wherein $a_2 > a_1$, the oversampled digital representation of the at least one radio frequency signal component has an amplitude $a_2'$, wherein the component produces an analog difference signal represented by $a_1 + |a_2 - a_2'|$, further comprising a digitizing device configured to receive the modified radio frequency signal having a saturation level of less than $a_2$ and greater than $a_1$.

* * * * *